United States Patent
Hsu et al.

(10) Patent No.: US 10,625,163 B1
(45) Date of Patent: Apr. 21, 2020

(54) METHOD AND SYSTEM FOR SUPPLEMENTING A VIDEO STREAM OF A FANTASY CARD VIDEOGAME

(71) Applicant: CARDBOARD LIVE, INC., Charlottesville, VA (US)

(72) Inventors: James Chieh-Wei Hsu, Vancouver (CA); Wilson Hunter, Charlottesville, VA (US)

(73) Assignee: CARDBOARD LIVE, INC., Charlottesville, VA (US)

( * ) Notice: Subject to any disclaimer, the term of this patent is extended or adjusted under 35 U.S.C. 154(b) by 0 days.

(21) Appl. No.: 16/537,102

(22) Filed: Aug. 9, 2019

(51) Int. Cl.
*A63F 13/69* (2014.01)
*A63F 13/30* (2014.01)
*A63F 13/95* (2014.01)
*A63F 1/00* (2006.01)

(52) U.S. Cl.
CPC .............. *A63F 13/69* (2014.09); *A63F 13/30* (2014.09); *A63F 13/95* (2014.09); *A63F 2001/008* (2013.01)

(58) Field of Classification Search
None
See application file for complete search history.

(56) References Cited

U.S. PATENT DOCUMENTS

| 10,142,664 | B2* | 11/2018 | Ardo | G06K 9/4652 |
| 10,462,535 | B2* | 10/2019 | Carter | H04N 21/812 |
| 2014/0359656 | A1* | 12/2014 | Banica | H04N 21/812 725/32 |
| 2018/0001216 | A1* | 1/2018 | Bruzzo | A63F 13/25 |

OTHER PUBLICATIONS https://github.com/Fugiman/deckmaster/blob/master/README.md, May 28, 2018.

* cited by examiner

*Primary Examiner* — Ronald Laneau
(74) *Attorney, Agent, or Firm* — Bechen PLLC; Timothy J. Bechen

(57) ABSTRACT

The present invention provides a method and system for supplementing a video stream of a fantasy card videogame including receiving gameplay data from a game log, the gameplay data representing a playing of a plurality of electronic gaming cards within the fantasy card videogame. The method and system analyzes the gameplay data to retrieve supplemental content associated with the electronic gaming cards played within the fantasy card videogame and transmits supplemental content to a viewer application associated with a streaming application. Whereby, the method and system displays the supplemental content in conjunction with the video stream, the viewer application displaying the supplemental content using an overlay function based on a user interaction with the video stream.

20 Claims, 7 Drawing Sheets

METHOD AND SYSTEM FOR SUPPLEMENTING A VIDEO STREAM OF A FANTASY CARD VIDEOGAME

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent files or records, but otherwise reserves all copyright rights whatsoever.

FIELD OF INVENTION

The present invention relates generally to improving videogame streaming and more specifically to detecting gameplay elements within the stream and generating supplemental content.

BACKGROUND

Fantasy card videogames continue to grow in popularity. These videogames provide electronic representations of a gaming board and playing fantasy cards from players' decks of cards. These games have evolved, including large numbers of fantasy cards available for the players' decks. Each card has unique designs and character properties. The game consists of the sequential playing of cards against other players, card characteristics controlling progress within the game. A popular series of fantasy card videogames are Magic: the Gathering® electronic videogames available from a variety of software developers. These fantasy card videogames seek to electronically replicate real-life card games.

Another growing area in videogame technology is gameplay streaming. Viewers now subscribe to various streaming services and watch gameplay. Current streaming technology is passive, viewers simply viewing the streaming content, maybe providing written or audio comments. For example, a common streaming platform is Twitch® available from Amazon. Other users may engage multiple systems, such as streaming content and talking with friends via Discord® available from Discord, Inc.

Viewers watching the fantasy card videogame streams are currently unable to get additional information about the cards being played at any specific moment within the game. Fantasy card information is further complicated by these games having thousands of unique cards, each with unique features. During a typical game, 50 to 75 of these unique cards are in-play.

One current solution is an administrator or commentator manually entering card information on the in-play cards. The large trove of card information for the large number of game cards and the small subset of card in-play complicates adding this content. This technique is cumbersome, relying on active manual data input. This technique also assumes that the viewer is interested in a very specific subset of digital cards on the screen. The viewer may have different needs or interests on specific cards, for example requesting more detailed information on a specific card.

Another technique is a software application entitled Deckmaster, developed by "Fugiman" and published on the software distribution site GitHub.com. Deckmaster is a streaming application extension displaying image data acquired based on data from the videogame, without intermediate processing. Deckmaster is also extremely limited to including only publicly-available image data from public databases.

This Deckmaster software solution does not include additional processing of the data from the desktop videogame. Moreover, this Deckmaster software solution could not facilitate or support any intermediate processing because it does not collect and process gaming data aside from the image retrieval calls. The Deckmaster software does not track gameplay activity and collect or process player deck information prior to gameplay. The Deckmaster software is an image supplement software, providing stock images for supplementing a streaming feed, but is devoid of collecting and processing gaming data.

Furthermore, the Deckmaster software solution has an unreliable execution, with inconsistent operations based on software variabilities of the gameplayer, the streaming service, the viewer application, and image database availability. Therefore, while Deckmaster seeks image distribution, it provides an unreliable software solution with numerous operational glitches and complications.

As such, there exists a need for supplementing streaming content of fantasy card videogames to include supplemental content for the viewer.

BRIEF DESCRIPTION

The present invention provides a method and system for supplementing a video stream of a fantasy card videogame. The method and system operates as one or more gamers are playing the videogame, such as using locally-executed gaming software or cloud-based software.

The videogame software generates gameplay data identifying the playing of electronic gaming cards. A game log stores the gameplay data.

A log-reader client program (LRCP) accesses the game log, analyzing the gameplay data to determine cards being played. The LRCP retrieves supplemental content from a prepared dataset, the supplemental content being associated with the electronic gaming cards. Therein, the LRCP then transmits the gameplay data and supplemental content to an extension backend service (EBS) module.

The supplemental content can be one or more types of content, such as card description information or commercial information. For example, the information may be the information found on the card itself, including abilities, strengths, weaknesses, and even the character backstory. In another example, the information may be gameplay data, such as a information on the value of a card within the gameplay sequence. The prepared dataset can be stored in one or more data storage locations having this card-specific information, such as available from public and non-public data sources. The prepared dataset may additionally include manually-entered or user-generated content associated with electronic gaming cards.

The videogame itself is being broadcast, streamed, to one or more viewers. In one embodiment, an intermediary streaming service receives the videogame output stream from a local streaming engine and redirects onto one or more streaming channels.

Via the EBS module, the invention transmits the supplement content to a viewer application associated with the streaming application that receives the videogame stream. The viewer application may be a plug-in or other extension within the streaming application.

As the viewer views the videogame stream, the viewer application monitors viewer interactions with the streaming application using an overlay function. As the viewer interacts in close proximity to an electronic gaming card in the streaming application output, e.g. such as moving a cursor over the card, the viewer application can then display the supplemental content.

The method and system therefore improves the viewer experience in watching a streaming fantasy card videogame by both: dynamically generating supplemental content using the gameplay data from the game log; and presenting this supplemental content based on viewer engagement of the streaming content.

A better understanding of the disclosed technology will be obtained from the following detailed description of the preferred embodiments taken in conjunction with the drawings and the attached claims.

DETAILED DESCRIPTION

Generally, the invention herein improves a videogame streaming content by dynamic gameplay determination, accessing supplemental data, and then supplementing the videogame stream with this supplemental content. The stream viewer can interact with the streaming content to better view and personalize receipt of this supplemental data. Therein, the invention improves the viewability of videogame streaming content in the fantasy card videogame space.

Figure 1:
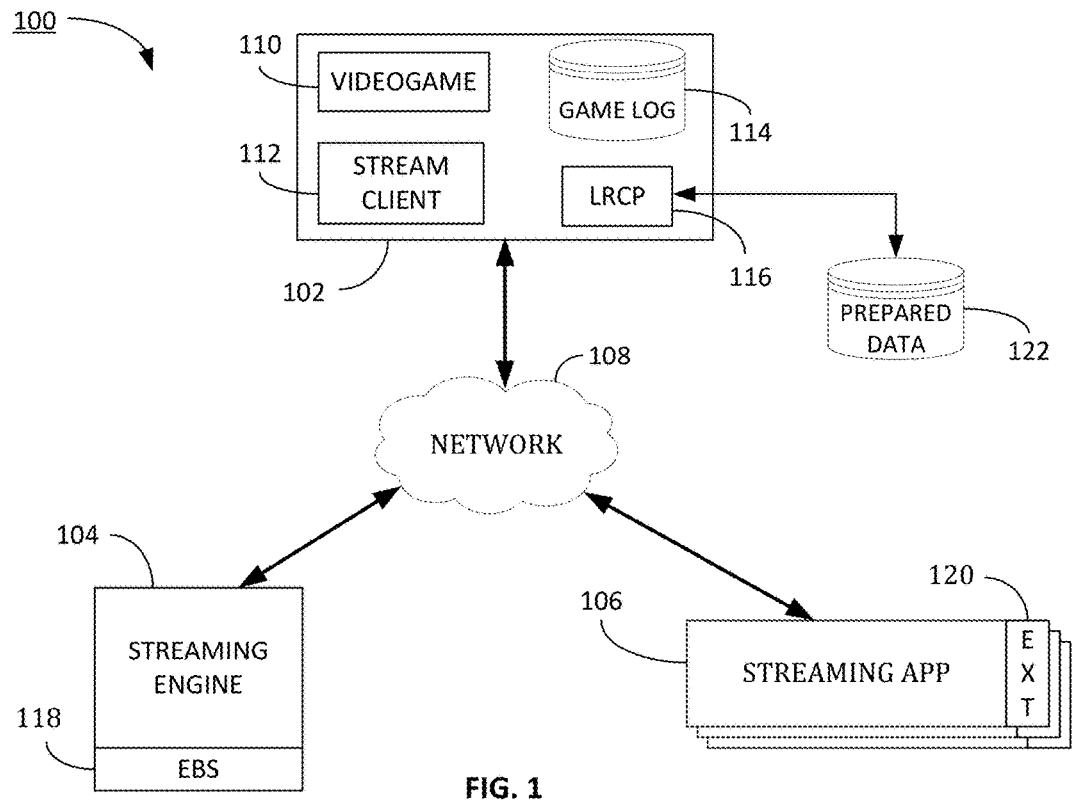
FIG. 1 illustrates a block diagram of a processing system for supplementing a video stream.

FIG. 1 illustrates a block diagram of a system 100 for supplementing a video stream of a fantasy card videogame. The system 100 includes a client device 102, streaming engine 104, and a plurality of streaming applications 106 communicating across a network 108.

The client device 102 can be any suitable gaming device or devices, such as a laptop or personal computer, a video gaming system, a mobile device, etc. The streaming engine 104 can be any suitable engine or engines providing video streaming or any similar type of video or content distribution. In one embodiment, the streaming engine 104 may be the Twitch® server accessible using known techniques for streaming content.

The streaming applications 106 are executable applications disposed on viewer devices. Consistent with known technology, viewers download and run streaming applications to view streaming content. In one embodiment, the streaming application may be from the Twitch® platform allowing for receipt and viewing of streaming content.

In the system 100, the client device 102 executes a videogame 110, such as a fantasy card videogame. The videogame 110 may be a locally-stored executable program, such as being run from local memory. The videogame 110 may also be a game stored on a disc or cartridge loaded into a gaming slot (not shown). In another embodiment, the videogame 110 may be a cloud-based or network-based executable game with an interface for player interaction.

As noted herein, a fantasy card videogame is an electronic game using a deck of electronic game cards, the cards having characters or gameplay elements disposed thereon. The game advances by players playing specific cards and the characteristics associated with the characters or gameplay elements advance the game. A fantasy card videogame expressly excludes any card-based game using a standard 52 or 54 card deck, having four defined suits of hearts, diamonds, spades, and clubs. By way of example, a fantasy card videogame can be a version of games using Magic the Gathering® cards but would not include games of poker, blackjack, cribbage, or other playing-card games using the standard 52/54 card deck.

The device 102 further includes a streaming client 112. Consistent with known technologies, the streaming client 112 may be a locally-executed application facilitating communication with the streaming engine 104 and distribution of the streaming content. In one example, a user can enable the streaming client 112 to duplicate a video output feed for distribution to the streaming engine 104 and subsequent distribution to viewers (via the streaming applications 106). The streaming client 112 may include additional user information for streaming, such as user id, security information, contact information, content distribution list, etc.

Within the client device 102, a game log 114 collects gameplay data generated by the videogame. Gameplay data includes any information relating to gameplay within the videogame 110. For example, gameplay data includes the names and identifiers of players, the type of game being played, decks of electronic cards for each player, general game cards, placement (or play) of cards within the game, including sequence of card play. The gameplay data is a log of activities occurring within the game. For example, if the game includes multiple players, the streaming engine 104 pulls the data from the player running the game and streaming engine, also recording the plays and game log data of player two.

The client device 102 further includes a log-reader client program (LRCP) 116. This program, in one embodiment, is a downloadable executable program running on the client device 102. Whereas, in other embodiments, the LRCP does not require placement within the client device, but rather accesses the game log for retrieving and distributing gameplay data as described herein.

The streaming engine 104 includes an additional processing element, an extension back-end service (EBS) module 118. The EBS 118 is a software module executing either on the same server as the streaming engine 104 or in another cloud-based execution environment. As described in greater detail below, the EBS 118 supplements the livestream feed.

In the system 100, the streaming applications 106 further include additional executables, extensions 120. The extensions 120 can operate as a plug-in with the streaming application, providing a viewer application for displaying supplemental content.

Digital collectible card games, such as videogame 110, typically contain 1500-2000 unique cards in each games' card pool. Of those, about 50 are active and in-play during any typical game. The system 100 enables supplementing the game play video stream with specific card information.

Therefore, based on the large amount of electronic gaming cards, a prepared dataset 122 includes supplemental data. In FIG. 1, the dataset 122 is illustrated as a stand-alone database, such as accessible via a networked connection. In another embodiment, the dataset 122 may be locally disposed with the client device 102 or in any other suitable location.

The prepared dataset 122 includes electronic card data, from public and/or private data sources (not shown). For example, one source may be image databases, for example images available from scryfall.com, the card image search engine. Another exemplary source may be Gatherer, another Magic Card database. Other sources may include proprietary text or image databases for specific cards, or for example user-generated information for cards.

In one embodiment, the prepared dataset 122 is hosted on a third party service platform for direct access by LRCPs 116 executed on client devices 102. The third party service can generate specific electronic gaming card content for supplementing the streaming content as described herein.

In one embodiment, a user installs or loads the fantasy card videogame 110 on his or her local computing/gaming device 102. As the user plays the videogame, the execution of the game generates the gameplay data stored in the game log 114. The user additionally installs the streaming client 112. For example, the streaming client 112 may be applications available from StreamLabs® OBS.

In one embodiment, the LRCP 116 is installed by the user on the client device 102. The LRCP 116 runs independent of the videogame 110, reading and interpreting the game log. The LRCP 116 then retrieves the supplemental data from the prepared dataset 122 based on interpreting the game log. The LRCP 116 transmits the gameplay information and supplemental content to the EBS 118 running in conjunction with the streaming engine 104.

In one embodiment, the game log, also referred to as a game file, is a simple text file fulfilled with the "event object" in JSON format. The LRCP 116 can read the log file in a loop, detecting when content changes. Upon change detection, the LRCP 116 processes the new information by decoding data into a program-readable format, processes the decoded data, and updates a game state representation variable within the LRCP 116. The system then uses this updated game-state representation to communicate with the EBS 118 via an API. As described in greater detail herein, the LRCP 116 further includes the supplemental data to compliment the updated game-state representations in communicating with the EBS 118.

A viewer viewing the streaming content installs and runs the extension 120 on his or her viewing device. For example, the viewer viewing the streaming content on a personal computing device running the streaming application 106 can run the extension 120 as a plug-in or extension to the application 106. In one embodiment, the extension 120 is a web plug-in, enabled by the viewer via account settings associated with the streaming application 106. As noted further below, the extension 120 is a viewer application that in one embodiment uses an overlay interface for providing the supplemental content to the viewer.

Figure 2:
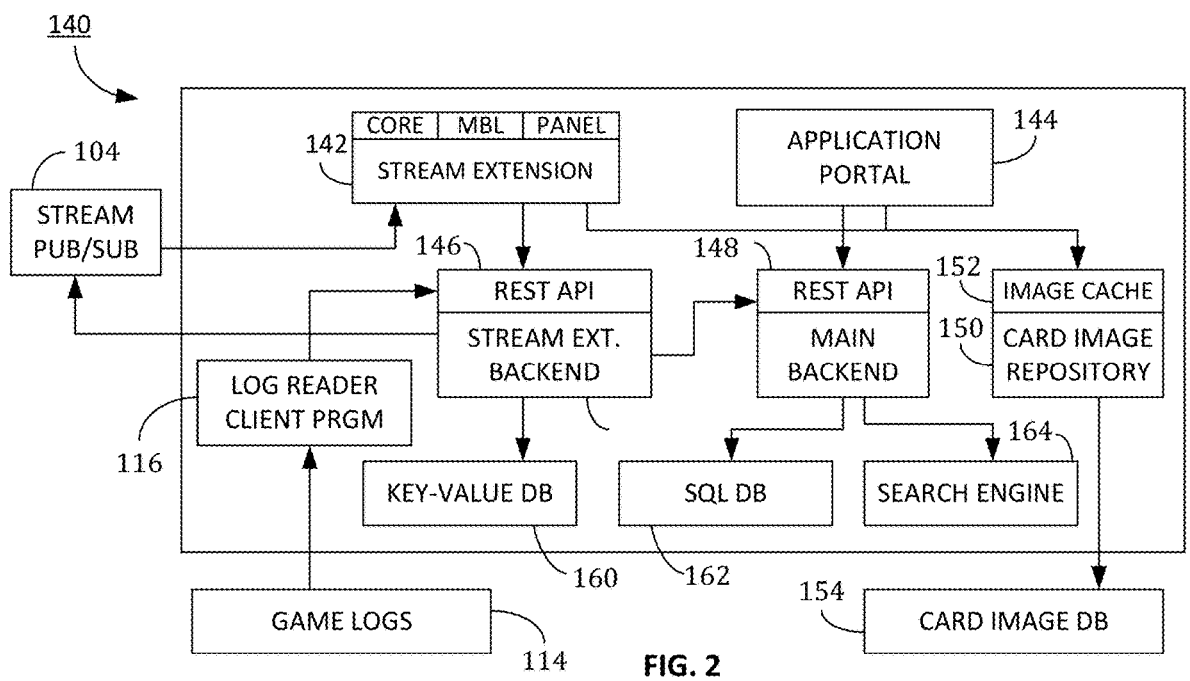
FIG. 2 illustrates a block diagram of one embodiment of an architecture for supplementing a video stream.

FIG. 2 illustrates an architecture diagram 140 with multiple computing resources. The resources include a stream extension 142 and application portal 144. These are user facing elements facilitating engagement and interaction.

The stream extension receives incoming data from the streaming engine 104. The extension 104 can further include a core processing module, a mobile processing module, and a panel module. The application portal 144 adds further information and user output to supplement the streaming content.

The architecture 140 includes three backend processing elements, including the streaming extension backend 146, the main backend 148, and the card image repository 150. The stream extension backend 146 generates output to the stream engine 104 based on the output from the extension 142. Additionally, the extension backend 146 transmits a signal to the main backend 148.

Both backend processing elements 146 and 148 include an application program interface for communication and data exchange. In this exemplary embodiment, the backend processing element with API processing modules 146 and 148 can utilize a representative state transfers directed towards web services.

The card image repository 150 can be any suitable memory device or devices have image data stored therein, images of fantasy playing cards. For example, the repository 150 may be the dataset 122 of FIG. 1 above.

Figure 3:
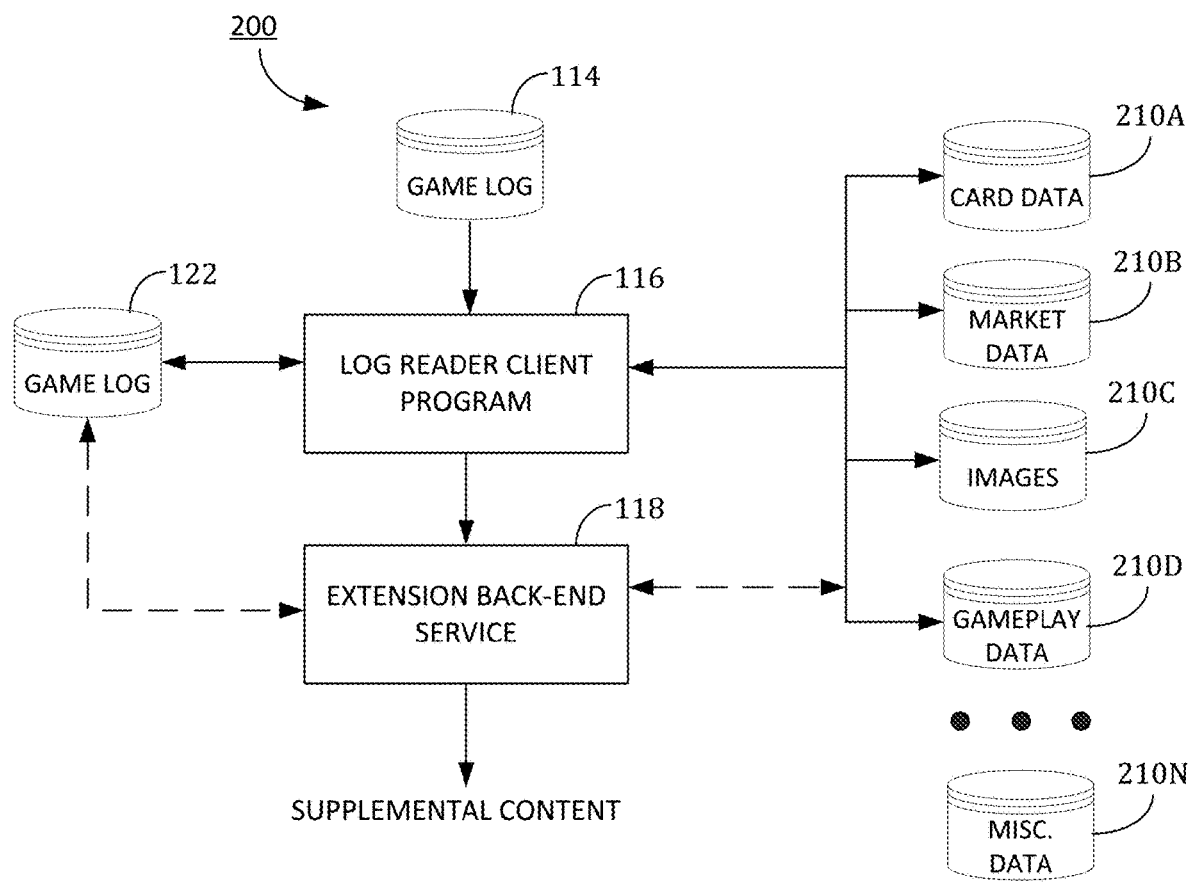
FIG. 3 illustrates a block diagram of one embodiment of processing operations for generating supplemental content.

Further within the system 140 are databases 160, 162 and 164. The stream extension backend 146 accesses the key-value store 160. In one embodiment, the store 160 is an in-memory database that persists on disk. The data it stores is a key-value format structure but much different kind of values are supported such as Strings, Lists, Sets, Sorted Sets, and Hashes. In one embodiment, the SQL database 162 may be an opensource database allowing for standard query logic data requests relating to electronic gaming card information. The database 164 may be a search engine database allowing for data search operations relating to the gaming card information.

Where the system 100 of FIG. 1 reads the game log, FIG. 3 illustrates one embodiment for generating the supplemental content. FIG. 3 illustrates general data interaction, where it is recognized these operations can be performed across one or more networked connections.

The system 200 of FIG. 3 includes the LRCP 116 receiving the gameplay data from the game log 114.

In one embodiment, the LRCP 116 reads the gameplay data from the game log to extract searchable information therefrom. For example, the gameplay data includes the name or other form of identifier for the cards active or being played within the game. In one embodiment, the gameplay data may include a field identifier indicating the card name. Upon recognition of the field identifier, the LRCP 116 then extracts the card name.

The LRCP 116 can therein access one or more databases having supplemental data therein. In one embodiment, the LRCP 116 accesses the prepared dataset 122. Further embodiments provide for accessing other databases(s). By way of example, the system 200 illustrates 5 exemplary databases, a card data database 210A, a marketplace data database 210B, an image database 210C, a gameplay data database 210D, and a miscellaneous data database 210N, where N represents any suitable integer. It is recognized that any number of databases 210 can be accessed. Moreover, the databases 210 can be local or network accessible, including public and/or proprietary information.

The LRCP 116 accesses these databases 210 to retrieve supplemental data associated with gaming cards being played, as indicated by the game log. Varying sources of data can be based on any number of different embodiments. For example, permissions or subscription services may include access to a proprietary image database 210. Another embodiment can be a viewer preference or setting for receiving particular types of information.

The LRCP 116 transmits the gameplay data and supplemental content to the EBS 118. In some embodiments, the supplemental content may have different formatting and the LRCP 116 or the EBS 118 may perform processing operations to modify the data for presentation. By way of example, card image data may have varying dimensions and all images may be resized to a determined pixel window setting. In another example, card data may be in a different language and requiring translation prior to display.

Figure 4:
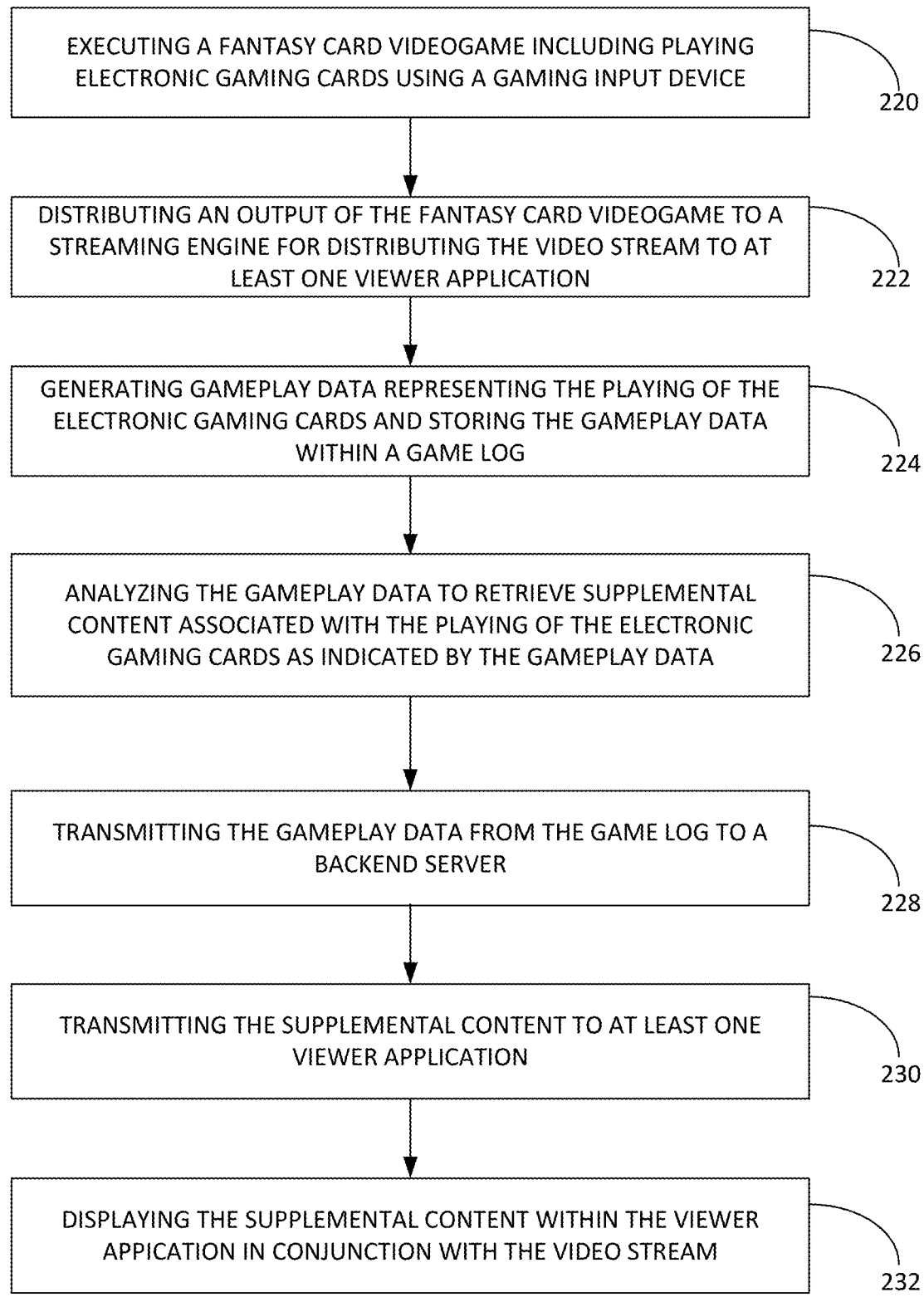
FIG. 4 illustrates a flowchart of steps of one embodiment of a method for supplementing a video stream.

The EBS 118 can therein access and retrieve data from the databases 210. The EBS 118 can perform processing operations for formatting or adjusting the supplemental content for the viewer application. In one embodiment, the supplemental content 118 sent from the EBS module 118 can be a raw data source with the viewer application filtering content. For example, the EBS module 118 may send all supplemental data available for a particular card, the viewer application having a setting to display only images and card data, but not market data.

Where FIG. 3 illustrates the LRCP 116 generating the supplemental content, it is recognized that processing operations may be disposed within or supplemented by the EBS 118. For example, the supplemental content retrieval operations can be performed by the EBS 118 using game log data determined by the LRCP 116. Therefore, FIG. 3 further includes the dashed-lines showing the alternative embodiment of connecting the EBS 118 to the servers 210 and prepared dataset 122

Where FIGS. 1-3 illustrate the processing environment and architecture, FIG. 4 is a flowchart of the steps of one embodiment of a method for supplementing a video stream of a fantasy card videogame.

Step 220 is executing a fantasy card videogame including playing electronic gaming cards using a gaming input device. As noted above, the videogame can be executed on a local processing device, with user interactions via a gaming controller or keyboard.

Step 222 is distributing an output of the fantasy card videogame to a streaming engine for distributing the video stream to at least one viewer application. In a typical embodiment, the streaming engine is network-based with a locally-executed application to process and distribute the game content to the streaming network. The viewer application is typically run by a third party looking to watch the livestream content across the network connection.

Step 224 is generating gameplay data representing the playing of the electronic gaming cards and storing the gameplay data within the game log. For example, gameplay data may include the name of a card (e.g. the name of the character shown on the card) being played. The gameplay data can also include playing sequence, such as if it is the first, second, third, etc. card being played.

Step 226 is analyzing the gameplay data to retrieve supplemental content associated with the playing of the electronic gaming cards as indicated by the gameplay data. In one embodiment, FIG. 3 illustrates this step.

Step 228 is transmitting the supplemental content to the backend server. Step 228 may be performed by the LRCP 116 of FIG. 1, the transmission being across the networked connection.

Step 230 is transmitting the supplemental content to at least one viewer application. In one embodiment, the supplemental content can be translated or otherwise modified for insertion into a presentable format for the viewer application. For example, for image data, images can be resized to fit a preset display window. In another example, for card data, information may be translated into a different language.

Step 232 is displaying the supplemental content within the viewer application within the viewer in conjunction with the video stream. The videogame itself is streamed via the streaming engine and the viewer application is run, in one embodiment, as an extension or plug-in to the locally-executed streaming player.

The viewer application receives the supplemental data and monitors user interfacing with the streaming application. When the user places a cursor near or over a card, or any other suitable interface operation to signify requesting supplemental content, the viewer application then displays the supplemental content.

Figure 5:
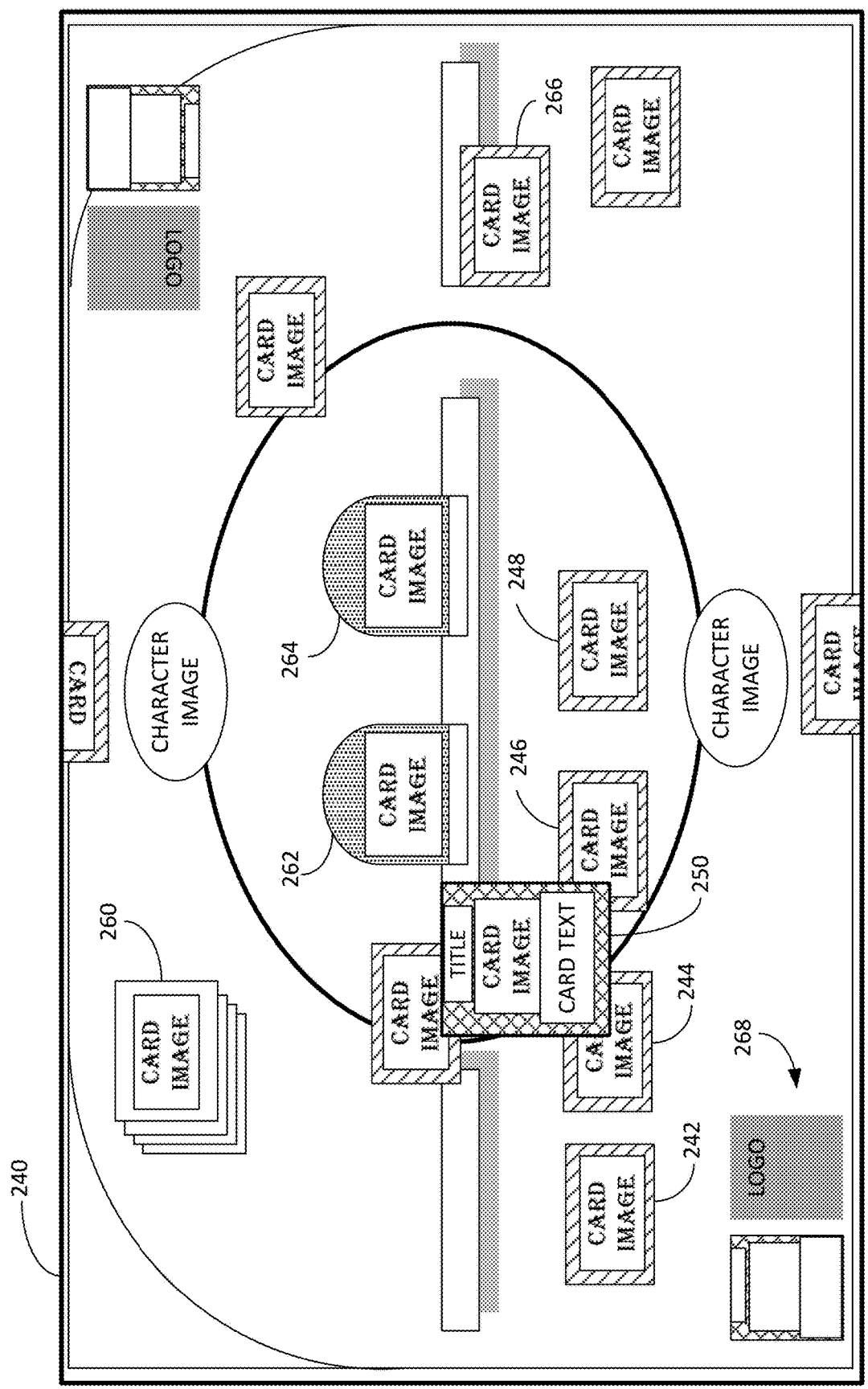
FIG. 5 illustrates a screenshot of a fantasy card videogame.

FIG. 5 illustrates a sample screenshot of a fantasy card videogame including a playing screen 240 with multiple fantasy cards. In this screenshot, four cards 242-248 are played with a fifth card 250 being played. The cards 242-250 include images, typically an image of the character or a feature of the card. The card being played 250 additionally includes a title field and card text.

Further visible, the playing screen 240 includes additional playing cards with images, such as cards 260, 262, 264, 266. The screen 240 further has a deck and a discard pile 268 for the player, among other features. The screenshot of FIG. 5 illustrates recognized gameplay playing the fantasy card videogame. This screenshot represents not only what the player sees in playing the game, but can also represent the streaming content visible to viewers.

Figure 6:
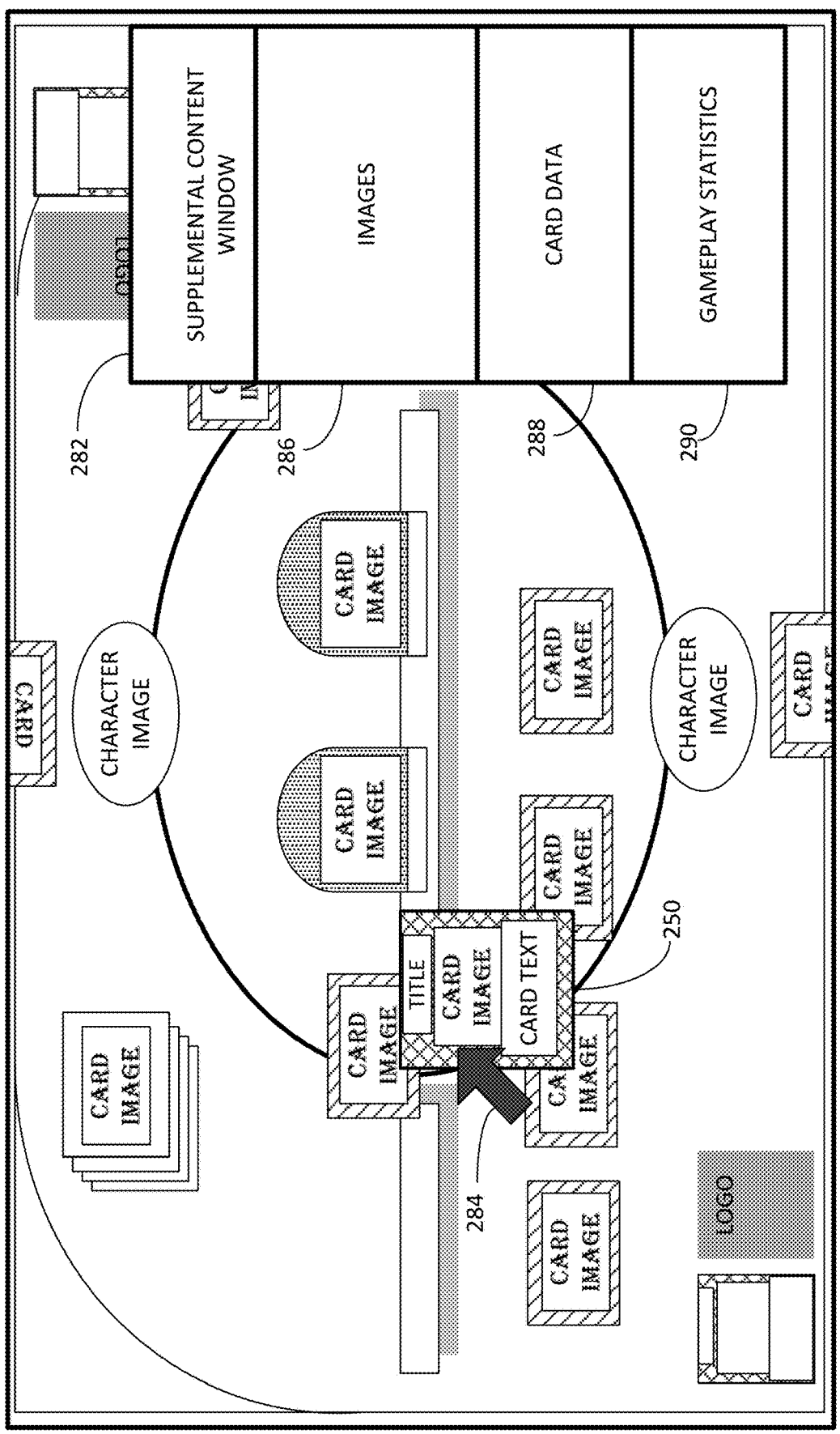
FIGS. 6-7 illustrate screenshots of a fantasy card videogame stream output with supplemental content.

Quickly recognizing and seeing the details of the electronic gaming cards is complicated by the limited real estate of the display screen 240. In the streaming viewer, FIG. 6 illustrates a screenshot of viewer application in response to viewer interactions. The screenshot 280 is similar to the screenshot 242 of FIG. 5, but includes the visual overlay 282 including supplemental content.

Based on tracking user interactions, the viewer application notes the placement of a cursor 284, or any other suitable positional marker, and displays the supplemental content associated therewith. In this case, a viewer can hover the cursor 284 near the card being played, causing the display of the supplemental content window 282.

In this example, the window 282 includes one or more images 286, a card data field 288, and gameplay statistics 290. For example, the images can be images of the card image not readily visible in the in-game display. The card data 288 can be the background story of the card, the powers, strengths and weakness of the character, and the statistics 290 can be data showing often this card is played and the strength or value of the current play.

In one embodiment, the determining of cards being played in on-screen locations is based on predetermined card-play locations or zones. In these videogames, the gaming board typically includes zones or areas for playing specific types of cards. Thus, detecting a viewer overlay and which supplemental information to display can be zone-based.

Similarly, based on available data from the game log, the game log may not include a specific playing sequence cards. Thus, the overlay application may not directly know which cards in specific zones are viewable and which are occluded. Therefore, one embodiment can include displaying all supplemental data from the zone and allowing the user to select or de-select supplemental content window(s) or section. Another embodiment can include gameplay intelligence to determine or estimate the sequence of card play based on known card plays, for example estimating play Card B after Card A based on the likely relation between Cards A and B.

In one embodiment, the viewer application maps the card images on the display screen using known scanning or image processing techniques. The cards images can be assigned x,y screen coordinates. When the cursor position is detected within this screen coordinates, the viewer application uses a look-up table or other reference to activate the supplemental content window 282, retrieve the appropriate fantasy card supplement content, and populate the data fields in the display.

In one exemplary embodiment, player 1 is playing and streaming a collectible trading card game. In this embodiment, player 1 has the LRCP installed and executing concurrent with the game. On a first turn, player 1 draws three cards: (1) water bucket; (2) sanctuary; and (3) bird sanctuary paradise. The LRCP reads the game log, which captures the state of player 1's hand including these three specific cards.

The LRCP broadcasts the card information to the EBS. In one embodiment, the EBS can therein access image data, market price data, and other information on the cards. This information is passed to the streaming application, via the extension. A pub/sub interface of the stream takes the information, renders it visually in the stream. Therein, viewers watching the stream of player 1 can see this supplemental card data.

The viewers, via the streaming app and extension, now see an overlay resting on top of player 1's streaming gameplay. The overlay display illustrates player 1's hand including: water bucket card plus image plus market price data; sanctuary card plus image plus market price data; and bird supreme paradise card plus image plus market price data.

In the game itself, player 1 can play the water bucket card on to the battlefield. The battlefield has a distinct zone for this card play. Player 1 now has water bucket card on the battlefield and sanctuary and bird supreme paradise cards in her hand. The LRCP reads the changes in game state (e.g. one card is now on the battlefield and not in player 1's hand. The process noted above repeats including the LRCP transmitting the updated information to the EBS and stream visual updates send to the extension application.

Back within game, player 1 can now pass. Opponent, player 2, has a hand of three cards, all unknown to player 1 and the stream viewers. Player 2 plays a card, Despicable Mage, on player 2's side of the battlefield.

Again, the LRCP recognizes the change in the game log and submits this information to the EBS. Based thereon, the visual stream is updated based on the gameplay as detected from the game log.

Figure 7:
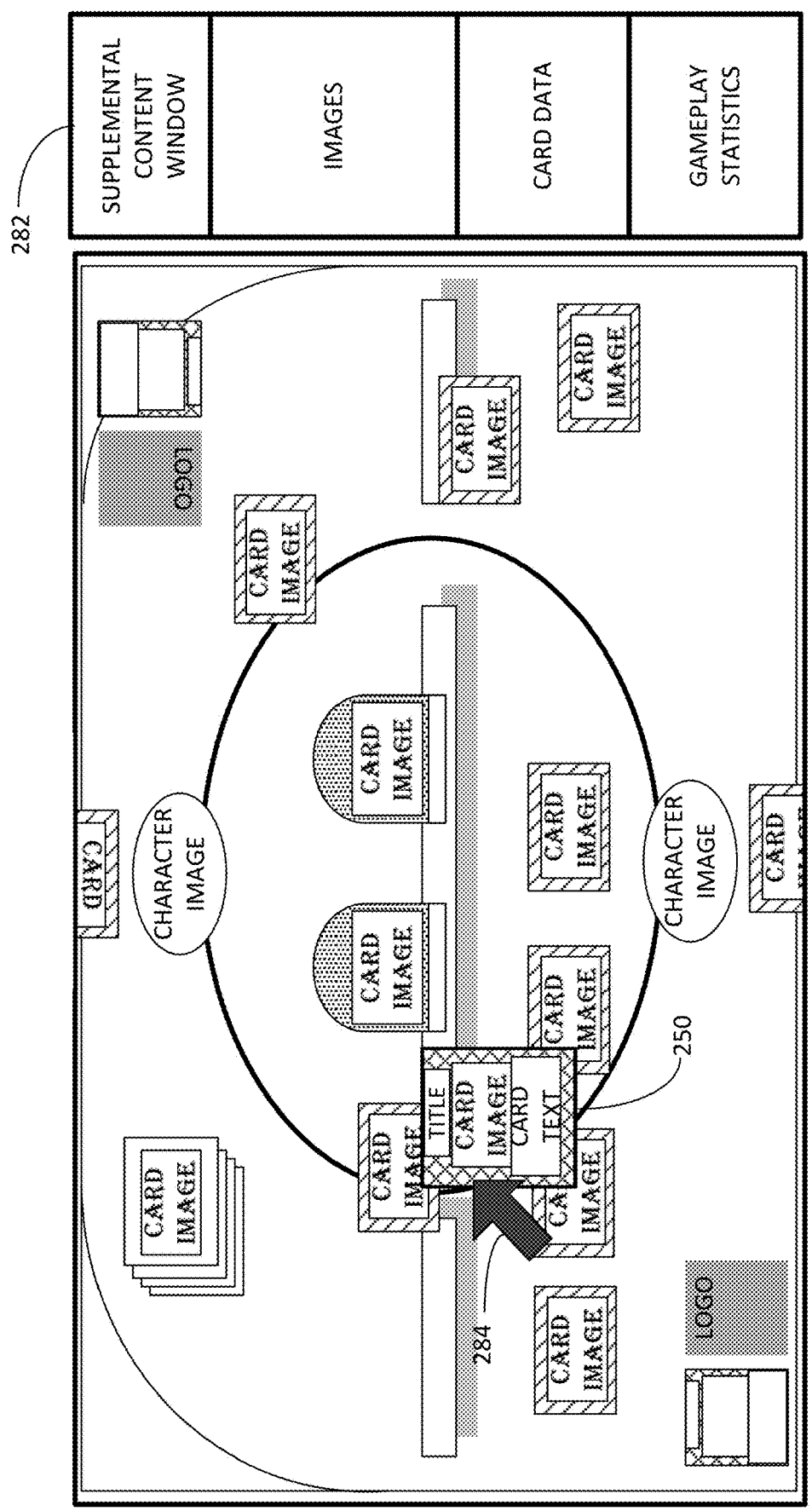

FIG. 7 illustrates another viewer display screen, here using a secondary window display. In this embodiment, the streaming display is in a first screen 300 and the supplemental content is in a second screen 302. Therefore, in this second screen, the content does not obscure any of the videogame streaming content. It is recognized that one embodiment may include these two screens 300 and 302 on the same output, but the supplemental content 302 can be directed to a second-screen environment, such as content displayed on a mobile phone and the streaming content viewed on a computer browser.

It is recognized that any number of viewing variations are within the scope of the invention herein. Varying embodiments can include differing windows, but can also include differing content within the windows. For example, one viewing window may include predictive analysis based on knowledge of. the player's decklist and based on what is already known about the game, including cards drawn and played. For example, one embodiment may include artificial intelligence or gameplay heuristics to determine estimated likelihood (percentages) of gameplay sequences as well as player odds. Thus a display window may include not only card information, but gameplay information including a calculated percentage for the player to win the game.

Another example of viewing information can be marketplace data. Players collect different cards and accumulate decks, including by purchasing collections of cards and individual cards. It is recognized marketplaces exist for purchasing these electronic cards. For example, FIG. 3, market data 210B database includes market data and can include historical data. Therefore, viewing data may include market price information such as current price on various markets, price last week, 52-week price high and low, percentage change in price over period of time, etc.

Further viewing windows can include augmenting card image with alternative images, such as from public and/or proprietary databases. For example, alternative images may include images different from the actual card image within the game. Further viewing customizations can include stylized frames, alternative colors, larger text formatting for accessibility and readability, etc.

The viewing window can also be a horizontally oriented window, where FIGS. 6-7 illustrate vertically oriented windows. For example, the window can include a moving ticker showing market data for card during gameplay.

Figure 8:
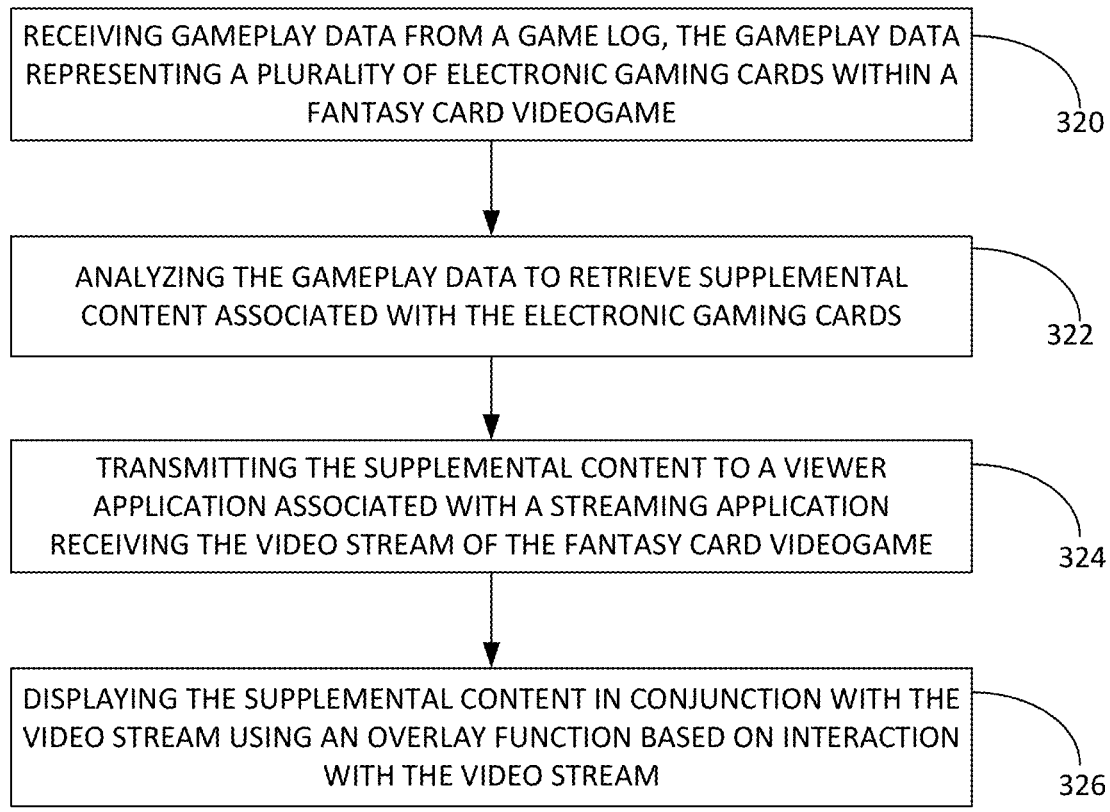
FIG. 8 illustrates a flowchart of the steps of one embodiment of a method for supplementing a video stream of a fantasy card videogame.

FIG. 8 illustrates steps of another embodiment of a method for supplementing a video stream of a fantasy card videogame. The above embodiments describe operation in a three processing system environment: the gaming device, the streaming server and backend processing system, and the viewer processing device. Other embodiments allow for different executable locations. For example, the gaming operations can be performed in a network or cloud-based environment with local or client-based execution being simply a user interface. In another example, the game log may be stored on the network and not client-based.

Step 320 is receiving gameplay data from a game log. The gameplay data is received from videogame execution, whether it be local or network-based execution.

Step 322 is analyzing the gameplay data to retrieve supplemental content associated with the electronic gaming cards. This analysis may be performed in either a network processing environment and can be locally-executed. In further embodiments, this step can be performed in different environments, such as one retrieval of supplemental information can be via a public content database and further retrieval is from a proprietary database.

As noted above, varying embodiments provide for different analysis and supplemental content. For example, the method and system having gameplay knowledge can engage in predictive analysis, estimating likelihood of card plays and player success. Without gameplay data, it would be statistically improbable to accurately predict the likelihood of any particular card play within a general gaming sequence and subsequent likelihood of a player's victory. The method and system having the gameplay data can then conduct predictive analysis based not on the universe of gamecards, but rather on the known subset of cards left in the player's deck. Therein, the processing system can perform statistical analysis on gameplay activities, including probability or estimations of specific card play using the known data set. The location and execution of these predictive operations can be performed within the processing environment, such as within the LRCP 116 or the EBS 118 of FIG. 1. In another embodiment, the predictive analysis may be performed on a third-party processing device or networked server having greater readily-available processing power.

Step 324 is transmitting the supplemental content to a viewer application associated with a streaming application and receiving the video stream of the fantasy card videogame. This transmitting step can be sent from a streaming server. In another embodiment, if the user generates and transmits the streaming content from a local device, the distribution can be generated directly from the user's computer.

Step 326 is displaying the supplemental content in conjunction with the video stream using an overlay function based on interaction with the video stream. In one embodiment, a viewer application is executed on the viewer device, such as a plug-in or extension to the streaming viewer. In another embodiment, viewer application can run on a server or network connection with a cursor position tracking application locally-executing on the viewer device.

In further embodiments, the game log may include additional information usable for improving the supplemental content and/or viewer application. For example, the game log may include card playing sequence information, usable for determining which card(s) are fully viewable on the electronic display.

In another embodiment, the game log may include a comprehensive list of a player's starting deck of cards. This starting deck information allows for a much more compact supplemental data or prepared dataset. For example, if each player has 50 cards, that means the dataset covers 100 cards instead of covering the thousands of cards. This can improve the data search and retrieval time components. Similarly, with smaller datasets, the supplemental data may be loaded at one or more different locations in the streaming and viewer application pipeline.

In one embodiment, the start deck list for a player can be determined from the game log listing the cards within the deck of the player. For example, one technique may include a user registering his or her deck with the game, that registration of a particular deck indicates a subset of cards that can be played within the game. During gameplay, the player pulls cards from the stack of cards and thus this pre-registered deck indicates the defined subset of available cards. In the example of a game having 1500 unique cards, the player can register a deck with 75 of those 1500 cards. Gameplay is one card as a time. Therefore, the processing described herein can be performed relative to the exemplary 75 cards of the registered deck instead of being relative to the full exemplary 1500 cards.

With multiple player games, one embodiment can include security protocols for limiting or prohibiting data sharing. For example, if player A registers his deck of cards, player B should be prohibited from acquiring access to knowledge of this deck. Otherwise, the player B can gain an unfair advantage knowing player A's cards. One exemplary technique for limiting or prohibiting data sharing can be to encapsulate or encrypt pre-registered deck information on a processor only local to the player or on a secured third-party server.

These fantasy card videogames are typically two-player games, against a computer or another player. In streaming content, the stream is initiated based on viewing one specific player's viewpoint. Therefore, where there are two players, it is conceivable to view the same game in two different streams. The system operates to process the game log data available from the player enabling the streaming function. In this embodiment, the game log, acting as the basis of the gameplay data, is generated by the streaming player's game execution.

With multiple players, one embodiment may include a network-based recognition of both players with shared access to the game logs. Access to this data improves supplemental data by having the prepared dataset more readily available. A central repository having knowledge of the game decks for both players can therefore better estimate and anticipate outcome likelihoods and contribute these data points for streaming viewers through the extension. For example, having knowledge of the decks allows estimating a percent likelihood of victory for a particular player based on remaining cards available not only in a player's deck but also with his or her hand.

The present method and system improves videogame streaming technology for fantasy card videogames by supplementing video stream outputs. Prior techniques limited viewer interactivity and the accessibility of in-game information. Prior techniques failed to account for the large number of different cards and variances in each of these cards within these fantasy card videogames. By running accompanying software, the method and system uses existing game log information, uses this information to determine supplemental content, and enhance the streaming viewer experience. The method and system makes card-specific information now readily available without disruption or interruption of the streaming experience.

FIGS. 1 through 8 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, Applicant does not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

What is claimed is:

1. A computerized method for supplementing a video stream of a fantasy card videogame, the method comprising:

electronically accessing a game log and receiving gameplay data therefrom, the gameplay data representing a playing of a plurality of electronic gaming cards within the fantasy card videogame by at least one user electronically playing the fantasy card videogame via a computerized gaming interface;

analyzing the gameplay data to retrieve supplemental content associated with the electronic gaming cards played within the fantasy card videogame;

electronically transmitting the supplemental content via a network connection to a viewer application associated with a streaming application receiving the video stream of the fantasy card videogame; and displaying the supplemental content in conjunction with the video stream, the viewer application displaying the supplemental content using an overlay function based on a user interaction with the video stream.

2. The method of claim 1 further comprising:
accessing the game log using a log-reader program.

3. The method of claim 2, wherein the fantasy card videogame and the log-reader program execute on a client device, the log-reader program transmitting the gameplay data from the game log to an extension backend service engine.

4. The method of claim 1 further comprising:
based on the gameplay data, accessing a card data database and retrieving the supplemental content therefrom.

5. The method of claim 4, wherein the supplemental content is content data about the plurality of electronic gaming cards.

6. The method of claim 1, wherein the supplemental content includes a likelihood of gameplay generated using predictive analysis based on the gameplay data.

7. The method of claim 1, wherein the displaying of the video stream is on a viewing device, the method further comprising:
executing the viewer application on the viewing device;
monitoring a cursor position on the video stream display in the viewer application;
upon detecting the cursor position within proximity to a first card of the plurality of electronic gaming cards, displaying the supplemental content associated with the first card.

8. A system for supplementing a video stream of a fantasy card videogame, the system comprising:
a non-transitory computer readable medium having executable instructions stored therein; and
at least one processing device, in response to the executable instructions, operative to:
electronically access a game log and receive gameplay data therefrom, the gameplay data representing a playing of a plurality of electronic gaming cards within the fantasy card videogame by at least one user electronically playing the fantasy card videogame via a computerized gaming interface;
analyze the gameplay data to retrieve supplemental content associated with the electronic gaming cards played within the fantasy card videogame;
electronically transmit via a network connection the supplemental content to a viewer application associated with a streaming application receiving the video stream of the fantasy card videogame; and
display the supplemental content in conjunction with the video stream, the viewer application displaying the supplemental content using an overlay function based on a user interaction with the video stream.

9. The system of claim 8, wherein the processing device, in response to the executable instructions, is further operative to:
access the game log using a log-reader program.

10. The system of claim 9 further comprising:
an extension backend service engine, wherein the fantasy card videogame and the log-reader program execute on a client device, the log-reader program transmitting the gameplay data from the game log to the extension backend service engine.

11. The system of claim 8 wherein the processing device, in response to the executable instructions, is further operative to:
based on the gameplay data, access a card data database and retrieving the supplemental content therefrom.

12. The system of claim 11, wherein the supplemental content is content data about the plurality of electronic gaming cards.

13. The system of claim 8, wherein the supplemental content includes a likelihood of gameplay generated using predictive analysis based on the gameplay data.

14. The system of claim 8, displaying of the video stream is on a viewing device, the processing device, in response to the executable instructions, is further operative to:
execute the viewer application on the viewing device;
monitor a cursor position on the video stream display in the viewer application;
upon detecting the cursor position within proximity to a first card of the plurality of electronic gaming cards, display the supplemental content associated with the first card.

15. A computerized method for supplementing a video stream of a fantasy card videogame, the method comprising:
executing the fantasy card videogame via at least one processing device, including playing a plurality of electronic gaming cards using a gaming input device;
electronically distributing an output of the fantasy card videogame to a streaming engine for distributing the video stream to at least one viewer application;
generating gameplay data representing the playing of the plurality of electronic gaming cards and storing the gameplay data within a game log;
via a log reader client program, accessing the game log and analyzing the gameplay data to retrieve supplemental content associated with the playing of the electronic gaming cards as indicated by the gameplay data;
electronically transmitting via a network connected the supplemental content to a backend server;
electronically transmitting the supplemental content to the at least one viewer application via the backend server; and
displaying the supplemental content within the viewer application in conjunction with the video stream.

16. The method of claim 15 further comprising:
monitoring a cursor position generated by a viewer within the viewer application; and
upon detecting the cursor position within proximity to a first electronic gaming card of the plurality of electronic gaming cards, displaying the supplemental content in a secondary display window relating to the first electronic gaming card.

17. The method of claim 15, wherein the supplemental content is content data about the plurality of electronic gaming cards.

18. The method of claim 15, wherein the supplemental content includes a likelihood of gameplay generated using predictive analysis based on the gameplay data.

19. The method of claim 15, wherein the at least one viewer application includes a streaming content viewer application and a supplemental content extension to the streaming content viewer application.

20. The method of claim 15, wherein the backend server is a separate processing server from the streaming engine.

* * * * *